United States Patent [19]
Cox

[11] Patent Number: 6,126,008
[45] Date of Patent: Oct. 3, 2000

[54] INTERACTIVE PACKAGING

[75] Inventor: Jon T. Cox, Riverton, Wyo.

[73] Assignee: The Brunton Company, Riverton, Wyo.

[21] Appl. No.: 09/013,112

[22] Filed: Jan. 26, 1998

[51] Int. Cl.⁷ .................................................. B65D 73/00
[52] U.S. Cl. ........................ 206/471; 206/316.3; 206/779
[58] Field of Search ............................. 206/316.1, 316.3, 206/232, 461, 462, 463, 464, 467, 470, 471, 349, 459.5, 775–779, 806

[56] References Cited

U.S. PATENT DOCUMENTS

| | | | |
|---|---|---|---|
| 4,165,805 | 8/1979 | Fethke et al. | 206/471 |
| 4,179,029 | 12/1979 | Fethke et al. | 206/471 |
| 4,899,877 | 2/1990 | Kiernan | 206/471 |
| 5,129,516 | 7/1992 | Theros | 206/471 |
| 5,279,417 | 1/1994 | Seaton | 206/470 |
| 5,595,295 | 1/1997 | Lin | 206/470 |
| 5,699,913 | 12/1997 | Richardson | 206/471 |
| 5,803,253 | 9/1998 | Zakarian | 206/471 |

*Primary Examiner*—Paul T. Sewell
*Assistant Examiner*—Luan K. Bui
*Attorney, Agent, or Firm*—John E. Reilly

[57] ABSTRACT

Packaging for products having at least one movable component, such as navigational compasses and binoculars, to allow a customer to try the packaged product prior to purchase. The packaging provides accessibility to the movable components by the customer. Instructions, including examples of use, are included to guide the customer through the features and the use of the product without the need of assistance from a sales clerk.

7 Claims, 3 Drawing Sheets

INTERACTIVE PACKAGING

BACKGROUND OF THE INVENTION

This invention relates to packaging; and more particularly relates to novel and improved packaging for displaying products with movable components.

Transparent packaging, such as blister packages and clam packages, are commonly used for displaying consumer products. Blister packs include a transparent portion mounted on a cardboard display card. Clam packaging includes at least two transparent sections pivotable to fold over a product. These types of packaging have the benefit of displaying products in a secure package along with product information, instructions, loose components and the like.

However, one drawback to these types of packaging is the inability of customers to actually try the product prior to purchase without first unpacking the product. In many instances, the package is destroyed once the product is removed. Thus, the customer is often forced to buy the product without the benefit of trying it out first.

This is particularly a problem when the product includes movable components. A customer may be able to visually inspect the product through the transparent packaging but will be unable to actually handle the product in order to fully examine the product.

Occasionally a display product is provided without packaging so that a customer can handle it. However, these display models take up valuable shelf space. Also, the directions for their use may not be readily available at the display location. Security is also an issue as well. Many products are stored behind a display case and require a clerk to be available to monitor their usage. This increases the cost of the merchandise as well as discouraging point of sale purchases.

One attempt to solve this problem is disclosed in U.S. Pat. No. 5,279,417, issued to Seaton. This disclosure includes a blister pack having a cut-out to allow a hand tool to manipulate the product. This patent does not disclose the use of detailed instructions to a customer on how to try out the features of the product, or the details of how a product such as navigational compasses or binoculars might be packaged in such a way as to allow the products to be carefully examined prior to purchase, particularly for products needing instructions without the assistance of a sales clerk.

It is therefore desirable to provide packaging that will allow a customer to freely interact with a packaged product, to be instructed on the use of the product, and to allow a customer to freely try the features of the product in light of these instructions, all without the intervention of a sales clerk.

SUMMARY OF THE INVENTION

It is therefore an object of the present invention to provide for novel and improved packaging for products that have movable components. It is particularly an object of the present invention to provide unique packaging that will allow a customer to interact with a product in accordance with directions and examples provided on a display card packaged along with the product.

It is another object of the present invention to provide novel and improved packaging for a navigational compass that will not only instruct a customer on the features of the compass but will also provide detailed step by step examples for the use of the compass and to provide accessibility through the packaging for the customer to manipulate the compass in accordance with the examples.

It is another object of the present invention to provide novel and improved packaging for binoculars that will allow a customer to view through the binoculars with no or minimal obstruction and to also allow the customer to manipulate the binoculars to focus the binoculars. It is also an object of the present invention to provide packaging that will describe not only the features of the binoculars but will also provide detailed instructions and examples for the customer to interact with the binoculars while the binoculars are still packaged.

It is another object of the present invention to provide novel and improved packaging for other products having movable components. The present invention provides packaging that will allow customers to try these products prior to purchase without damage to the packaging for these products.

In accordance with the present invention, packaging for various products is provided using, for example, clam packaging or blister packs. The packaging includes at least one opening to allow a customer to access and manipulate a movable component on the packaged product. Instructions on the features of the product as well as examples on the use of the product are shown on a display card packaged with the product.

In one embodiment, the rotatable barrel of a navigational compass extends through an opening on the packaging. A detailed example for finding a specific direction is provided on a display card packaged with the compass to allow a customer to try the compass in accordance with the example prior to purchase.

In another embodiment, a package for binoculars is designed to allow a customer to place the packaged binoculars to their face and view objects through the binoculars without disturbing the packaging. Openings are provided for a customer to access the focus knobs and/or the diopter to allow the binoculars to be easily focused. Examples of use and of the binocular's features can be inserted in the packaging so the binoculars can be easily demonstrated by the customer prior to purchase.

The above and other objects of the present invention will become more readily appreciated and understood from a consideration of the following detailed description of preferred and modified forms of the present invention when taken together with the accompanying drawings in which:

DETAILED DESCRIPTION OF A PREFERRED EMBODIMENT

Figure 1:
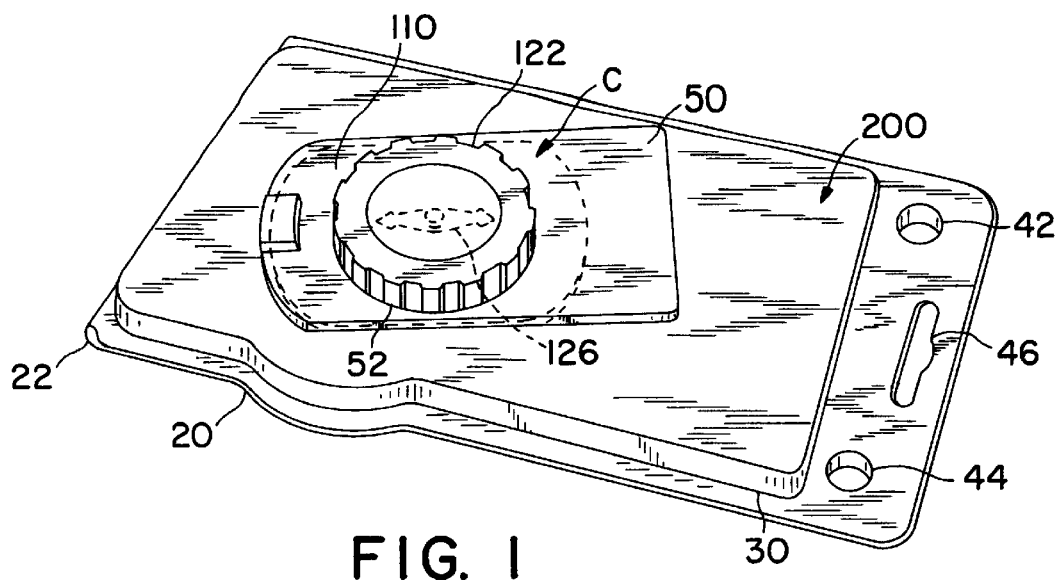
FIG. 1 is a perspective view of a preferred embodiment of the present invention illustrating a packaged navigational compass.
Figure 2:
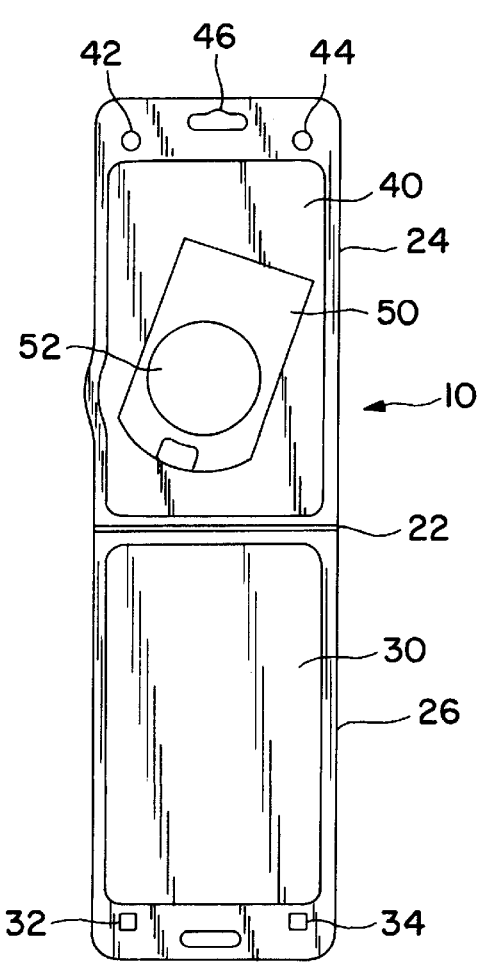
FIG. 2 is a front view of the open packaging of the invention of FIG. 1.

Referring in more detail to the drawings, as shown in FIGS. 1 and 2, a preferred embodiment of the present invention is described In this particular preferred embodiment, a product, such as navigational compass "C", is illustrated contained in a "clam" type package 10. The clam type package 10 includes elongated panel 20 formed of a transparent material, such as polyvinyl chloride (PVC), that is semi-rigid; that is, the material is stiff with some flexibility. It is to be clearly understood that this preferred embodiment is provided for descriptive purposes only and is not meant to unduly limit the scope of the inventive concept. Other materials, including opaque or semi-transparent plastics, cardboard, metallic, etc. can be used as well as other types, shapes and sizes of package containers.

Panel 20 includes "crimped" portion 22 near its midsection. Crimped portion 22 forms a "living hinge" between two sections 24, 26 on panel 20. Sections 24, 26 are thus able to fold over on one another. Section 26, in this embodiment, includes raised inner platform 30. Two indentations 32,34 are formed on the outer end of section 24.

Section 24 includes center recess 40 having similar dimensions as platform 30 for receiving platform 30 in engagement therewith. Two raised members 42, 44 are formed near the upper end of section 26. As sections 24, 26 are folded over onto one another about hinge 22, platform 30 is engaged or inserted into recess 40. Raised members 42, 44 are engaged or inserted in snug-fitting relation to the indentations 32, 34 to securely fasten the two sections together. The interference between members 42, 44 and indentations 32,34 create a secure package. Aperture 46 at the top of panel 20 is provided for engaging a hangar rod on a merchandise display.

Rectangular cavity 50 is formed in the front face of center recess 40 and raised slightly above the recess for providing a container for the product being packaged. In the preferred embodiment, the product presently being described, the product is compass "C" having substantially rectangular base 110 and circular body 120. Circular body 120 includes rotatable azimuth ring 122 with liquid filled drum 124 and needle 126. The appropriate indicia are marked on compass C. Cavity 50 thus conforms to the shape of compass 100. In this preferred embodiment, cavity 50 includes opening 52 in the center of the front face of cavity 50.

The product also includes display card 200. Display card 200 has dimensions substantially equal to the dimensions of raised platform 30 and indentation 40. Display card 200 may include product and marketing information relevant to the product, in this instance, compass C. In the preferred embodiment, display card 200 includes printed information pertaining to the use of the product. For instance, in the present application, display card may have information detailing an example of the use of compass. One such example is the step by step details describing how a user might select a direction, rotate azimuth ring 122 of compass C to align the indices relating to the desired direction and then move compass until needle 126 is aligned with these indices. This information could be printed on the front of display card 200 or on the back.

In use, as shown in FIG. 1, compass C is inserted in cavity 50 so that azimuth ring 122 extends through opening 52 of cavity 50 and base 110 is secure within cavity 50. Display card 200 is inserted over the bottom of compass C and into indentation 40 of section 26. Section 24 and section 26 are then folded together so that platform 30 engages against display card 200. Members 24,26 are then engaged in indentations 34, 36 to secure sections 24, 26 together to form package 10 with compass C and display card 200 within. Azimuth ring 122 of compass C extends through opening 52 of cavity 50 of the package so that the customer can easily rotate the azimuth ring.

In use, package 10 can be displayed on most merchandise shelves and point of sale displays. No clerk or assistance is required for a customer to inform themself about the product. A customer can pick the package off the shelf and manipulate the compass intuitively or in accordance with the directions and examples on the display card. The customer can easily rotate the azimuth ring 122 on compass C without opening the package itself. This allows the customer to try the product according to the instructions on the display card so as to fully understand the product before purchasing.

It is to be expressly understood that this exemplary embodiment is provided for descriptive purposes only. Other variations and embodiments are considered to be within the scope of the inventive concept. For instance, a "blister pack" could be utilized or other types of packaging.

DETAILED DESCRIPTION OF MODIFIED FORMS OF INVENTION

Figure 3:
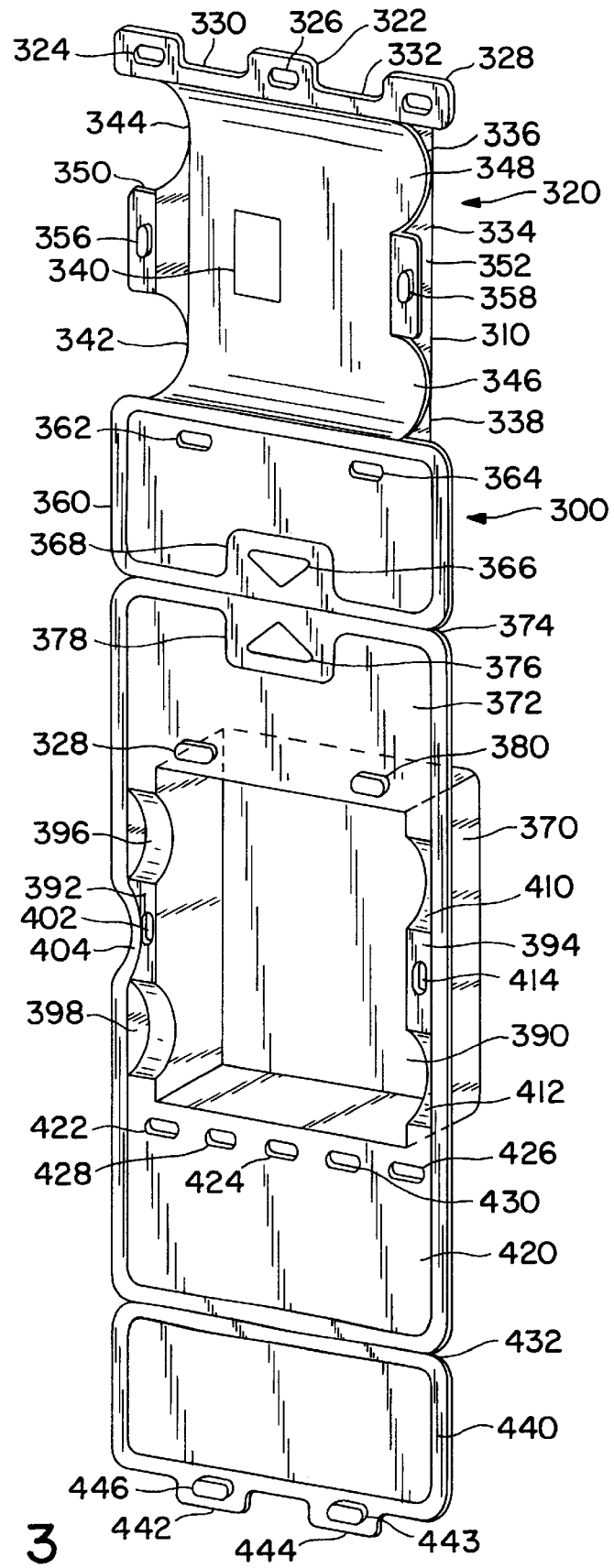
FIG. 3 is a front view of another preferred embodiment of the present invention illustrating a package for binoculars.
Figure 4:
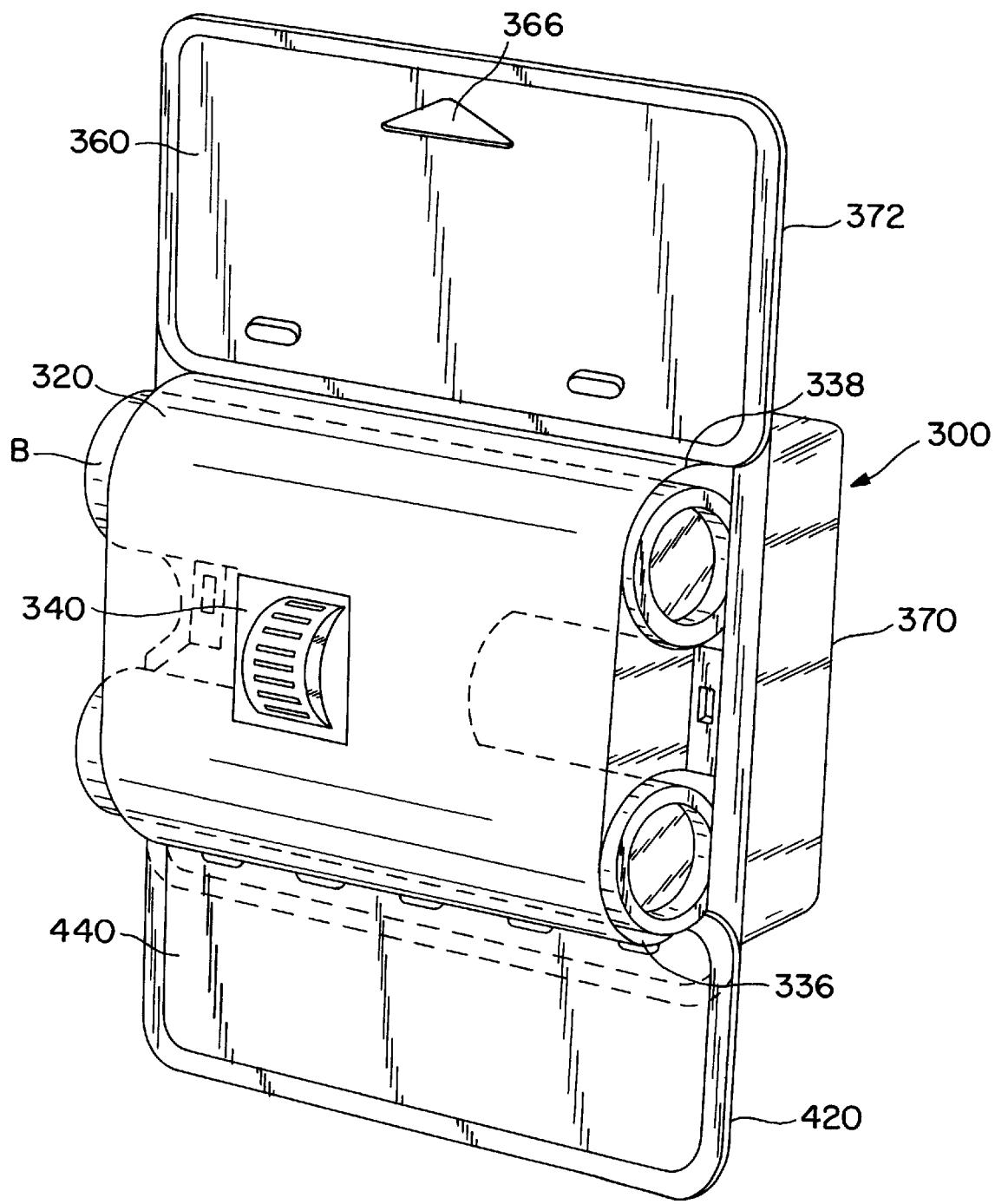
FIG. 4 is a perspective view of the invention of FIG. 3 illustrating the packaged binoculars.

The modified form of the invention as illustrated in FIGS. 3 and 4 is intended to package binoculars. A "clam" package is used to provide a transparent display package along with security for the product. A similar problem with the binoculars exists as it did with the compass described above. In order for a customer to try the binoculars prior to purchase, a display model, usually along with a clerk, is typically necessary. The present invention solves this problem by providing packaging that will allow a customer to easily try the features of the binocular without the need of a sales clerk's assistance.

Package 300, shown in FIGS. 3 and 4, is formed of panel 310 of a transparent semi-rigid material, such as polyvinyl chloride (PVC) or other suitable materials. Panel 310 is formed of a one-piece blank. First panel section 320 includes tab 322 having three spaced indentations 324, 326, 328. Notches 330, 332 are formed between these indentations. Raised portion 334 includes curved radius portions 336, 338, as clearly shown in FIG. 4. Opening 340 is cut-out or die-cut in the center of the front face of the raised portion 334, as will be discussed in greater detail below. Openings 342, 344, 346, 348 are formed in opposing sides of raised portion 334 with center sides 350, 352 extending between the respective pairs of openings. Projections 356, 358 are formed in the bottom of each of center sides 350, 352.

Second panel section 360 extends from first panel section 320 and is of substantially rectangular shape. Two spaced indentations 362, 364 are formed in the upper area of panel section 360. Triangularly-shaped indentation 366 is formed in reinforced area 368 of panel 360. In the preferred embodiment of the present invention, indentation 366 includes an aperture extending there through.

Third panel section 370 includes panel portion 372 of similar size and shape as second panel section 360. Living hinge 374 connects second panel section 360 and third panel section 370. Triangularly-shaped projection 376 is formed in reinforced area 378 of third panel section 370 for snug-fitting inserting into complementary triangularly shaped indentation 366 of panel 360. An aperture may be formed in projection 376. Two spaced projections 378, 380 are formed in the lower end of panel portion 372 for engagement in spaced indentations 362, 364 of panel section 360.

Cavity 390 is formed in the middle portion of third panel section 370. Cavity 390 is recessed inward from the sides of panel 370 to form support ledges 392, 394 on each side of cavity 390. Concave ledges 396, 398 are formed spaced from one another on support ledge 392. The radius of concave ledges 396, 398 is selected to support the ocular lens of the binocular to be packaged. Mid-portion 400 of support ledge 392 between concave ledges 396, 398 is radiused inward toward cavity 390 to form a "nose" recess 404. Indentation 402 is formed on the upper surface of support ledge 392 between concave ledges 396, 398 for mating engagement with projection 356 of first panel section 320.

Concave ledges 410, 412 are formed spaced from one another in support ledge 394. The radius of concave ledges 410, 412 is selected to conform to the object lenses of the binocular to be packaged. Indentation 414 is formed on the upper surface of mid-portion of support ledge 394 between concave ledges 410, 412 for mating engagement with projection 358 of first panel section 320.

Lower panel portion 420 of third panel section 370 is substantially flat, and rectangularly-shaped and extends downward from cavity 390. Three upwardly-extending projections 422, 424, 426 are spaced from one another and sized for mating engagement with indentations 324, 326, 328 of first panel section 320. Two spaced indentations 428, 430 are formed in lower panel portion 420 between projections 422, 424, 426.

Bottom panel section 440 extends from lower panel portion 420 with living hinge 432 extending between them. Two tabs 442, 444 extend outwardly from bottom panel 440 and spaced from one another. Projections 446, 448 extend upwardly from each of tabs 442, 444 respectively.

In use, package 300 is used to package binoculars, as shown in FIG. 4. Binoculars "B" are placed in cavity 390 so that the ocular lens are supported in concave ledges 396, 398 and the object lens are supported in concave ledges 410, 412. Product information and display cards may be placed in cavity 390 beneath the binoculars prior to the binoculars being placed in cavity 390. First panel section 320 and second panel section 360 are pivoted about living hinge 374 so that projections 378, 380 of third panel section 370 snugly engage indentations 362, 364, respectively. Triangularly-shaped projection 376 also engages in triangularly-shaped indentation 366 of second panel section 360. Projections 356, 358 on first panel section 320 are inserted in complementary indentations 402, 414 of third panel section 370. Openings 342, 344 of panel section 320 fit over the ocular lens of binocular B while openings 346, 348 of panel section 320 fit over the object lens of binocular B. Projections 422, 424, 426 of panel section 420 engage in indentations 324, 326, 328 of first panel section 320. The engagement of all of the projections into the respective mating indentations serves to securely lock the first panel section 320 and second panel section 360 over the binocular and third panel section 370. Bottom panel section 440 folds over the top of first panel section 320 which is engaged on third panel section 370. Projections 446, 448 of bottom panel 440 engages in indentations 428, 430 to lock bottom panel 440 onto third panel section 370 to provide additional security.

Apertures through the triangularly shaped projection and indentation allow the package to be displayed on a hangar rod. Display cards may be inserted in the package 300 to provide additional information, particularly instructions on the use of the binoculars and to instruct a customer on the features of the binocular. Panel portions 360, 440 and cavity 390 provide space for such information.

A customer may pick up the packaged binoculars 300 up and place the package so that the customer's nose is inserted into nose recess 404 of the package. Openings 342, 344 allow the customer to look through the binocular. Openings 346, 348 give a clear view through the binocular without obstruction. Opening 340 allows a customer to actually adjust the focus of the binocular by rotating the focus knob of the binoculars without unpacking the package. A customer may also be able to rotate the diopter adjustment on the appropriate object lens to finely adjust the focus on the binoculars.

These features of the packaging of the present invention enable a customer to try and be comfortable with a product prior to purchase. The products can be displayed on merchandise shelves without a display model or without the need for a clerk's assistance. The products are still securely packaged and the products can be tried without destroying the packaging.

It is therefore to be understood that while preferred and modified forms of invention are herein set forth and disclosed that the above and other modifications and changes may be made therein without departing from the spirit and scope of the present invention as defined by the appended claims.

I claim:

1. In combination, a navigational compass having a flat base with an upwardly projecting, rotatable azimuth ring, and a package for displaying and packaging said navigational compass, said package comprising:

a pair of elongated panels, one of said panels having a raised platform defining a compass base-holding cavity therein with said azimuth ring projecting upwardly from said base through an opening in said panel, said ring being fully exposed for manual rotation externally of said panel; and printed information viewable through said package providing information regarding the use of said compass by a customary accessing said azimuth ring.

2. The package of claim 1 wherein said printed information includes:

examples of use of said compass to demonstrate the features of said compass.

3. The combination according to claim 1 wherein said panels are superimposed upon one another, including means releasably connecting said panels together.

4. The combination according to claim 3 wherein said azimuth ring includes means for rotating said azimuth ring about an axis perpendicular to said elongated panels.

5. A clamshell type package for use in combination with a navigational compass having a manually rotatable azimuth ring projecting outwardly from one surface of said compass, said package comprising first and second elongated panels, said first panel being transparent and provided with a recess therein sized for insertion of said compass, and an opening in a front face of said first panel for outward projection of said rotatable azimuth ring so as to be fully exposed for manual rotation of said azimuth ring without removal of said compass from said package.

6. The package of claim 5 wherein said package includes:

printed information viewable by a customer for providing information regarding the use of the navigational compass.

7. The package of claim 6 wherein said printed information includes:

an example of the use of the compass to demonstrate the features of the compass by the customer manipulating the rotatable azimuth ring through said opening in accordance with said example.

* * * * *